(12) United States Patent
Lippert et al.

(10) Patent No.: US 6,321,912 B1
(45) Date of Patent: Nov. 27, 2001

(54) MOUNTABLE WORKSURFACE

(75) Inventors: Charles E. Lippert, Grand Rapids, MI (US); Bradley D. Dreier, Auburn, AL (US)

(73) Assignee: Mobile Office Vehicle, Inc., Grand Rapids, MI (US)

( * ) Notice: Subject to any disclaimer, the term of this patent is extended or adjusted under 35 U.S.C. 154(b) by 0 days.

(21) Appl. No.: 09/041,271

(22) Filed: Mar. 12, 1998

(51) Int. Cl.$^7$ .................................................... B65D 85/30

(52) U.S. Cl. ...................... 206/576; 206/320; 224/276; 224/584

(58) Field of Search ..................... 224/276, 413, 224/417, 584; 206/320, 576; 190/103, 105

(56) References Cited

U.S. PATENT DOCUMENTS

| | | | |
|---|---|---|---|
| 4,260,084 | * | 4/1981 | Warren, Jr. ........................ 224/417 X |
| 5,114,060 | * | 5/1992 | Boyer ..................................... 224/413 |
| 5,405,068 | * | 4/1995 | Lovett ................................... 224/153 |
| 5,445,266 | * | 8/1995 | Prete et al. ........................... 206/320 |
| 5,560,524 | * | 10/1996 | Brune ............................... 224/153 X |

OTHER PUBLICATIONS

Three sheets containing a pictorial representation of the Desk Drive™ unit which, on information and belief, has been in public use in the United States since at least 1995.

* cited by examiner

Primary Examiner—Jacob K. Ackun
(74) Attorney, Agent, or Firm—Van Dyke, Gardner, Linn & Burkhart, LLP

(57) ABSTRACT

A mountable worksurface comprises a worksurface rotatably attached to a support which is removably mounted to an object. When mounted, and in the open position, the worksurface projects from the cover and provides a rigid surface upon which to work. In a preferred embodiment, the mountable worksurface is in the form of a case for a portable computer having a compartment dimensioned to receive the computer and a cover hingedly connected to the rear of the compartment. The exterior surface of the cover carries a sleeve and a pocket, permitting the cover to be removably mounted on an object by placing the object between the interior of the sleeve and pocket and the exterior of the cover. Adjustment straps extend between the interior surface of the cover and the bottom wall of the compartment and are adjustable to control the distance between the cover and the compartment. Supports positioned in the cover and the bottom wall of the compartment impart rigidity to the case and protect the computer during transport.

14 Claims, 4 Drawing Sheets

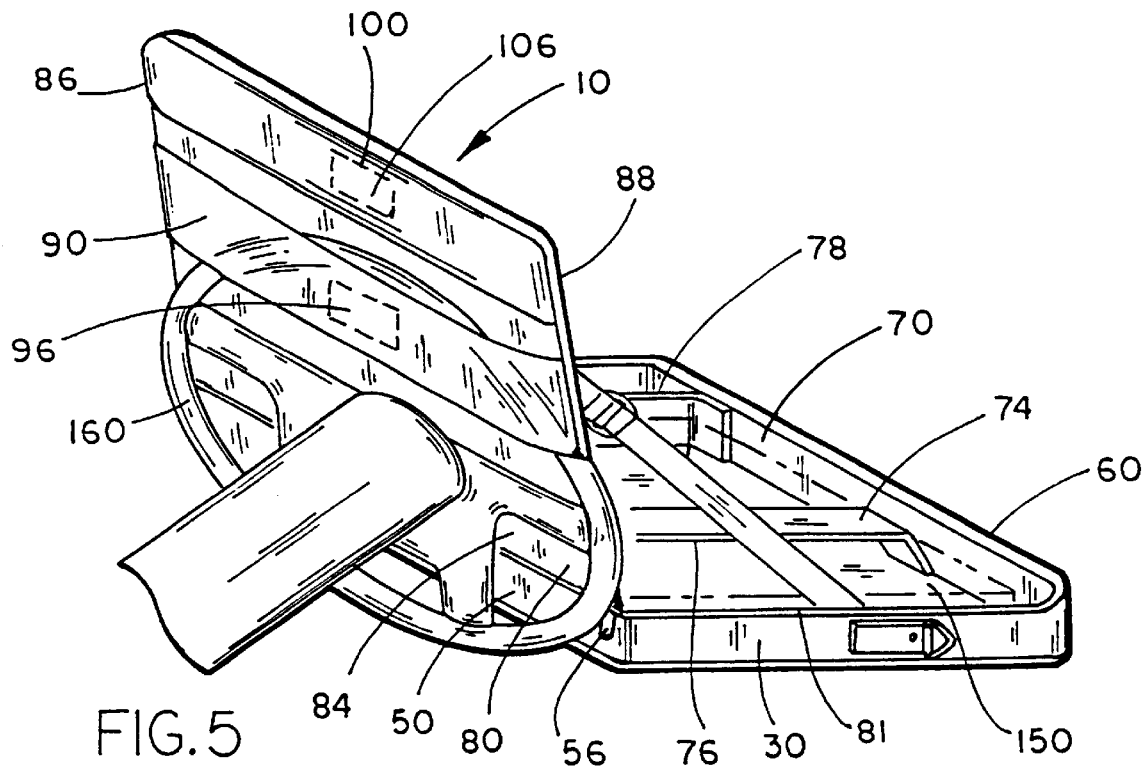
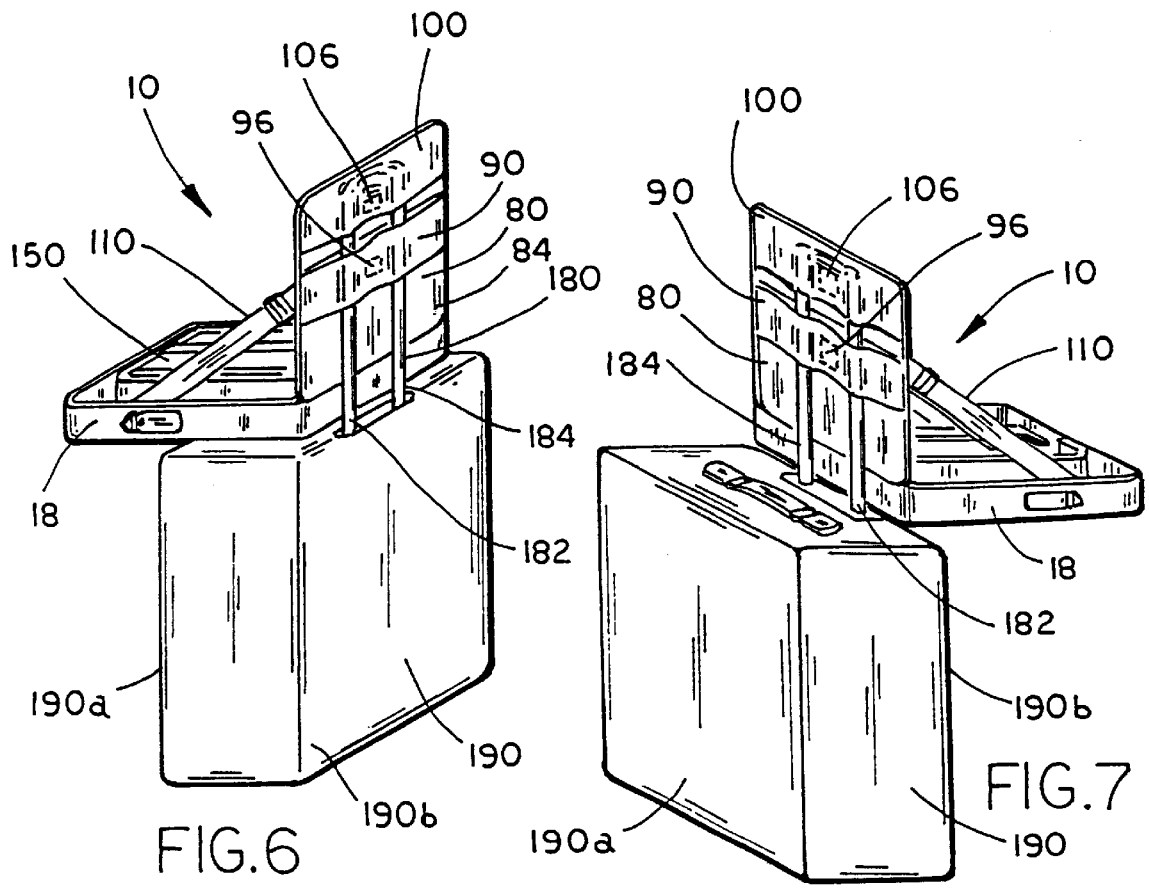

MOUNTABLE WORKSURFACE

BACKGROUND OF THE INVENTION

This invention relates generally to worksurfaces and, in particular, to a mountable worksurface for a portable computer.

In today's society, there is an ever increasing burden upon individuals to be more productive. Both academically and professionally, individuals are required to accomplish a greater number of tasks in order to remain competitive. In response to this demand, it is not uncommon to witness people working at times which were heretofore spent in a leisurely fashion. In airport lobbies, parked vehicles, and all types of waiting rooms, people are often seen performing business or school related tasks. The work performed in these settings usually involves reading and/or writing particular documents of interest.

One tool which has become necessary, and often indispensable to both professionals and students alike, is the portable computer. Due to the ever decreasing size and increasing speed of the circuitry used in these computers, in conjunction with the advancement of rechargeable batteries which provide longer use times between chargings, the portable computer enables an individual to effectively use a computer in almost any location.

Most portable computers comprise a visual screen or monitor hingedly connected to the rear of a keyboard section. In operation, the computer is positioned on a substantially horizontal surface and the screen rotated away from the keyboard until the proper viewing angle is achieved. When not in use, or in transportation, the screen is rotated over the top of the keyboard and removably attached thereto by a clip, lever, or other form of attachment. Usually the computer weighs no more than ten pounds, and when in the closed position, resembles a slender rectangular box which is easily transported.

Due to their convenience and portability, those computers are used by a wide variety of individuals for a number of different purposes. They can be used to permit an individual to work, study, or simply for entertainment. Moreover, due to their compact nature, portable computers can be used in a variety of different environments.

One environment in which a portable computer is utilized is in a bus or train station, and most prevalently, an airport. In these situations many business people and students use their portable computers while they await their respective form of transportation. Additionally, portable computers can often be found in the vehicles of those whose business requires travel. Traveling salesmen, construction site supervisors, and a variety of other professionals rely upon the portable computer.

One problem routinely encountered by users of portable computers is the lack of adequate support given to the computer while it is in use. Whether one is sitting in an airport lobby or the driver's seat of a parked vehicle, use of a portable computer requires the individual to place the keyboard section upon one's legs. Using one's legs as support for a personal computer is unsatisfactory for a number of reasons. First, the computer is exposed, and when in public areas, is susceptible to damage caused by inadvertent contact with individuals or equipment. Also, when the computer is situated upon one's legs, the user must remain relatively still so as to maintain the stability or balance of the computer. Requiring the user to maintain relative stillness is both uncomfortable and may lead to muscle aches and injury. Furthermore, one is forced to maintain a static and often awkward position of one's arms and hands in order to type on the keyboard. Continued long term or repeated placement of one's hands and arms in this position can lead to discomfort and/or muscular damage to the forearms, wrists and hands.

Consequently, there exists a need for an adjustable worksurface which is removably mountable to an object, thereby permitting rigid support of a paper tablet, calculator, book or computer.

SUMMARY OF THE INVENTION

Accordingly, the present invention provides an adjustable worksurface having a support hingedly connected thereto, wherein a closed position is achieved by placing the support over the worksurface. Rotation of the support away from the worksurface defines an open position and enables the individual to utilize the worksurface. The support is mounted on an object to provide rigid suspension for the worksurface. An adjustment assembly permits an individual to vary the distance between the support and the worksurface.

In a preferred aspect, the mountable worksurface of the present invention is embodied in a computer case having a compartment dimensioned to receive a portable computer. A cover is hingedly connected to the rear wall of the compartment and can be rotated from a closed position wherein the cover is positioned atop the compartment, to an open position wherein the cover is rotated away from the compartment. In the closed position, the cover is fastened to the compartment by means of a fastener, preferably a zipper running along the top edge of the compartment and the edge of the cover. The exterior surface of the cover is formed with a sleeve attached to the opposing sides of the cover, while a pocket is formed along the sides and top of the exterior surface of the cover. Both the sleeve and the pocket permit the computer case to be mounted on a rigid object by placing such object between the inner surface of the sleeve and the pocket and the exterior surface of the cover. Thus when mounted, and in the open position, the present invention provides rigid support for a portable computer, with the compartment acting as a worksurface upon which one may use the computer.

According to another aspect of the invention, both the pocket and sleeve are equipped with a fastener which removably fastens the same to the exterior surface of the cover. These fasteners serve to hold an object firmly in place between the cover and sleeve or pocket, and also facilitate transportation of the case when used in conjunction with luggage having extendable rails.

According to another aspect of the invention, the case includes an adjustment assembly permitting the user to adjust the distance of the compartment relative to the cover when the case is mounted and in the open position. Preferably, the assembly includes a pair of straps extending from the interior surface of the bottom wall of the compartment and being received by a pair of loops formed in the interior surface of the cover. These straps maintain the compartment a fixed distance away from the cover. Each strap is equipped with an adjustable fastener, enabling the individual to adjust the distance between the cover and the compartment.

According to yet another aspect of the invention, both the cover and the bottom wall of the compartment are formed with a space between their interior and exterior surfaces. Into these spaces are placed supports, imparting rigidity to the case as well as protection for the computer against damage caused by inadvertent contact.

In a preferred embodiment, the present invention provides a mountable computer case which allows a user to removably attach the computer case to a stable object. For example, when it is desired to work in one's car, the case cover may be mounted on the steering wheel such that the wheel is positioned between the interior surface of the sleeve and the exterior surface of the cover. When in the lobby of an airport or a train station, the cover may be mounted on the extended rails of a piece of luggage. Specifically, the rails would be positioned between the sleeve and the cover, while the top of the rail, or handle, abuts the interior surface of the pocket.

Additionally, when in a classroom or conference room, the cover may be mounted on the back of a chair having a rigid back such as a typical straight back chair or folding chair. When mounted, the compartment projects away from the back of the chair, thus allowing an individual sitting therebehind to use the computer. When mounted and in the open position, the present invention provides rigid, self-sustained support for a portable computer. Moreover, the case may be adjusted so as to vary the distance between the compartment and the cover, which in turn enables the user to adjust the angle of the computer to a comfortable typing position. Additionally, when used in conjunction with luggage having extendable rails, the computer case may be positioned over the piece of luggage with the rails fastened between the sleeve and the cover thereby facilitating convenient transportation; and because the rails are fastened between the cover and the sleeve, the potential for theft is reduced.

These and other objects, advantages and features of this invention will become apparent upon review of the following specification in conjunction with the drawings.

BRIEF DESCRIPTION OF THE DRAWINGS

FIG. 5 is a rear, perspective view of a computer case according to the invention illustrated mounted to a steering wheel;

FIG. 6 is a rear, perspective view of a computer case according to the invention shown in the open position and illustrated mounted upon the rails of a piece of luggage;

FIG. 7 is a rear, perspective view of a computer case according to the invention shown in the open position and mounted upon the rails of a piece of luggage in a direction opposite from that illustrated in FIG. 6;

DETAILED DESCRIPTION OF THE PREFERRED EMBODIMENTS

Figure 1:
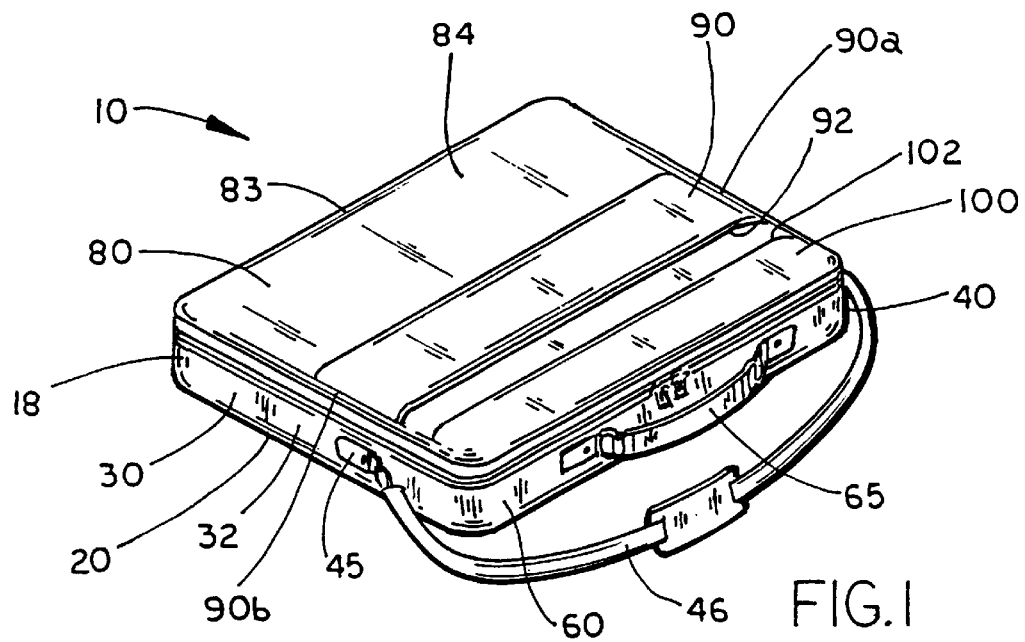
FIG. 1 is a perspective view of a computer case according to the present invention shown in the closed position.

The present invention advances a mountable worksurface having a worksurface rotatably connected to a support. The support is mounted to an object, and when so mounted, the worksurface can be rotated away from the support and adjustably held a fixed distance therefrom by an adjustment assembly. When mounted, the support provides suspension for the worksurface and permits one to work thereon without having to balance or hold the worksurface.

Referring now specifically to FIGS. 1–4, and the illustrative embodiments depicted therein, a mountable worksurface embodied in a computer case 10 comprises a compartment 18 having a bottom wall 20, a pair of opposing side walls 30 and 40, a rear wall 50, a front wall 60, and an interior space 70. Interior 70 is dimensioned to receive a portable computer 150, and may have a pair of straps 74, 76 extending from interior surface 62 of front wall 60 and interior surface 52 of rear wall 50. Straps 74, 76 are removably fastened over the top of computer 150 by means of complimentary portions of a hook and loop fastener such as that made from VELCRO™ (not shown). A partition 78 may also be positioned within interior 70 to provide separate storage for any peripherals or other items normally accompanying computer 150. Exterior surface 64 of front wall 60 includes a handle 65, whereas exterior surfaces 32 and 42 of side walls 30 and 40 are formed with clips 45 receiving a shoulder strap 46.

Hingedly connected to top surface 54 of rear wall 50 on an elongated piano-type hinge 55 (FIG. 4) is a support or cover 80. As shown in FIG. 1, cover 80 is dimensioned to fit over interior 70 of compartment 18, thus defining a closed position. An open position is established by the rotation of cover 80 on hinge 55 in a direction away from compartment 18. Cover 80 is secured to compartment 18 by a zipper assembly 56 having metal or plastic teeth 57 running along edge 19 of compartment 18, complementary teeth 58 running along edge 81 of cover 80, and a movable closure pull 17. It will be recognized by those with ordinary skill in the art, that alternative assemblies for fastening cover 80 to compartment 18 may be used without departing from the spirit and scope of the present invention. For example, a latching mechanism or a hook and loop fastener may be substituted for zipper assembly 56.

Interior surface 82 of cover 80 may include a jacket 35 (FIGS. 2 and 4) permitting the placement of papers between interior surface 82 of cover 80 and jacket 35.

Exterior surface 36 of jacket 35 may be equipped with a business card holder 37 and a series of pen or pencil holders 38. Additionally, jacket 37 may be segregated into an additional compartment 39 by zipper assembly 33.

Exterior surface 84 of cover 80 is formed with a fabric, vinyl or leather sleeve 90 which preferably matches the material from which the exterior surface of case 10 is constructed. Preferably, sleeve 90 is rectilinear but flexible, and spans from side 86 to side 88 of cover 80, and is attached to the edges of cover 80 at 90a, 90b such that the central portion between the edges may flex away from exterior surface 84 of the cover. Also positioned along exterior surface 84 of cover 80 is a pocket 100. Preferably, pocket 100 is formed from a rectilinear length of flexible material such as that used for sleeve 90 but attached to both sides 86 and 88 and top 89 of cover 80. It is preferred that top 92 of sleeve 90 be positioned a preselected distance below bottom 102 of pocket 100. It is also preferred that pocket 100 open toward bottom 83 of cover 80. Sleeve 90 and pocket 100 may be attached to exterior surface 84 of cover 80 by any means commonly employed in the art, including, but not limited to, stitching, gluing or heat fusing. Computer case 10, including sleeve 90 and pocket 100, may be constructed of any material normally used in the art. Such materials include polymeric compositions and fabrics having sufficient strength and durability. Preferably, however, case 10 is made of leather. Furthermore, case 10 can be manufactured in different sizes to accommodate computers of varying dimension.

Figure 3:
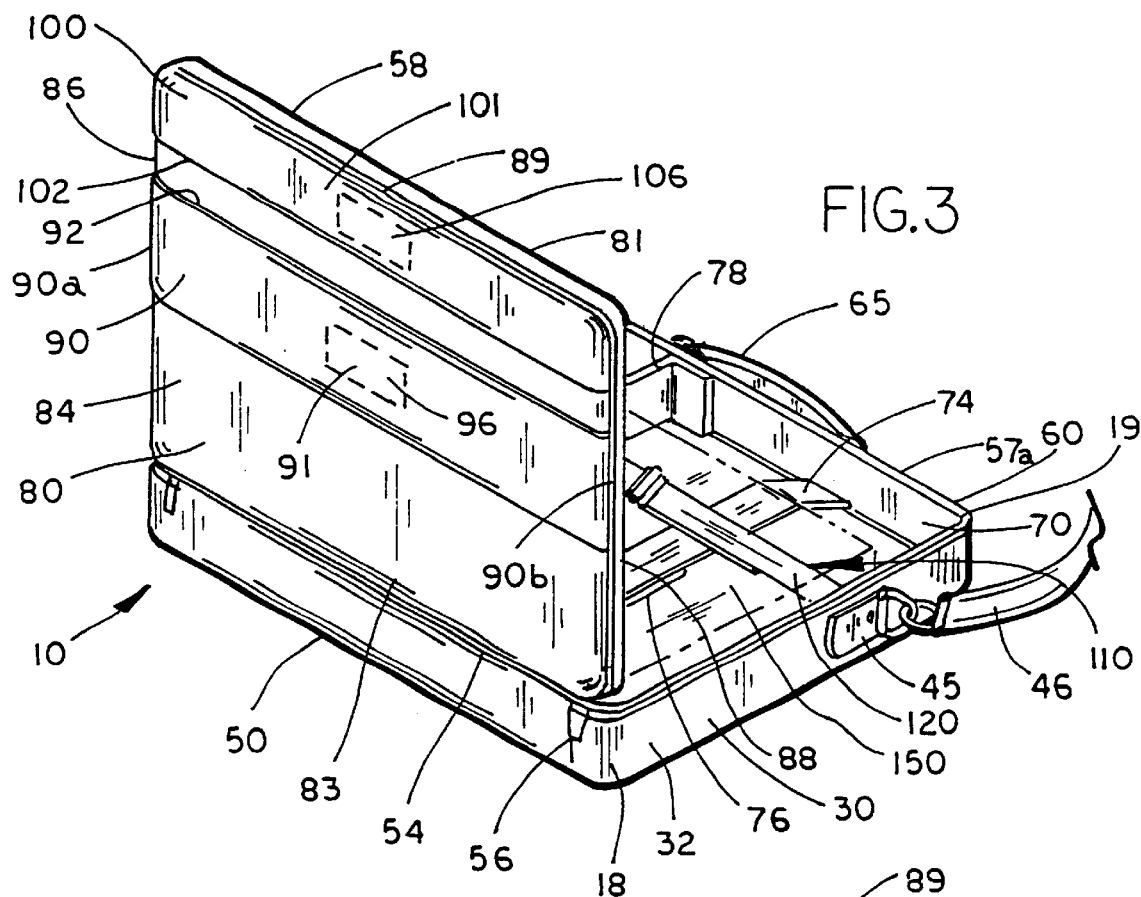
FIG. 3 is a rear, perspective view of a computer case according to the invention illustrating a portable computer in phantom.
Figure 4:
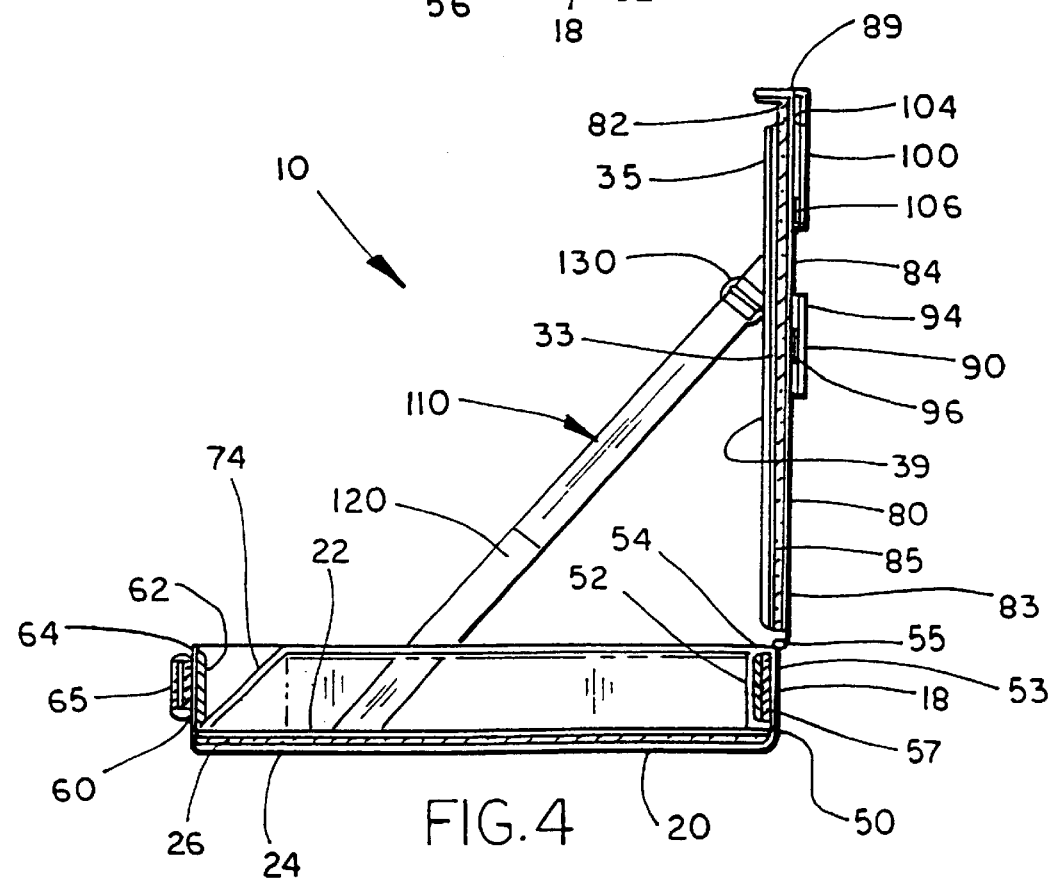
FIG. 4 is a cross-sectional side, view of a computer case according to the invention taken along line IV—IV of FIG. 2.

As illustrated in FIGS. 1, 3 and 4, the center area 91 of sleeve 90 is removably attached to exterior surface 84 of cover 80 by a fastener 96. Likewise, the center area 101 of pocket 100 is removably attached to exterior surface 84 of cover 80 by a fastener 106. Fasteners 96 and 106 are hook and loop fasteners, such as VELCRO™, with the hook portion of the hook and loop fasteners preferably being attached to exterior surface 84 of cover 80 while the loop portions of hook and loop fasteners 96 and 106 are attached to the interior surfaces 94 and 104 of sleeve 90 and pocket 100, respectively. Those with ordinary skill in the art will immediately recognize that alternative fasteners such as snaps, buckles or the like may be used in lieu of hook and loop fasteners 96 and 106 without departing from the spirit and scope of the present invention.

Positioned between interior surface 82 and exterior surface 84 of cover 80 is a support 85 (FIG. 4). Support 85 is a generally planar sheet of material providing rigidity when cover 80 is mounted on an object as will be discussed in detail below. Furthermore, support 85 provides protection for computer 150 when case 10 is in the closed position. For the same reasons, a planar sheet or support 26 is placed between interior surface 22 and exterior surface 24 of bottom wall 20. A support 57 may also be inserted between interior surface and exterior surface 53 of rear wall 50. Supports 85, 57 and 26 may be made of any material commonly used in the art having the requisite rigidity and strength. Such materials include, but are not limited to, wood and polymeric compositions, and preferably have a thickness within the range of between about 1/16 to 1/4 inch.

Figure 2:
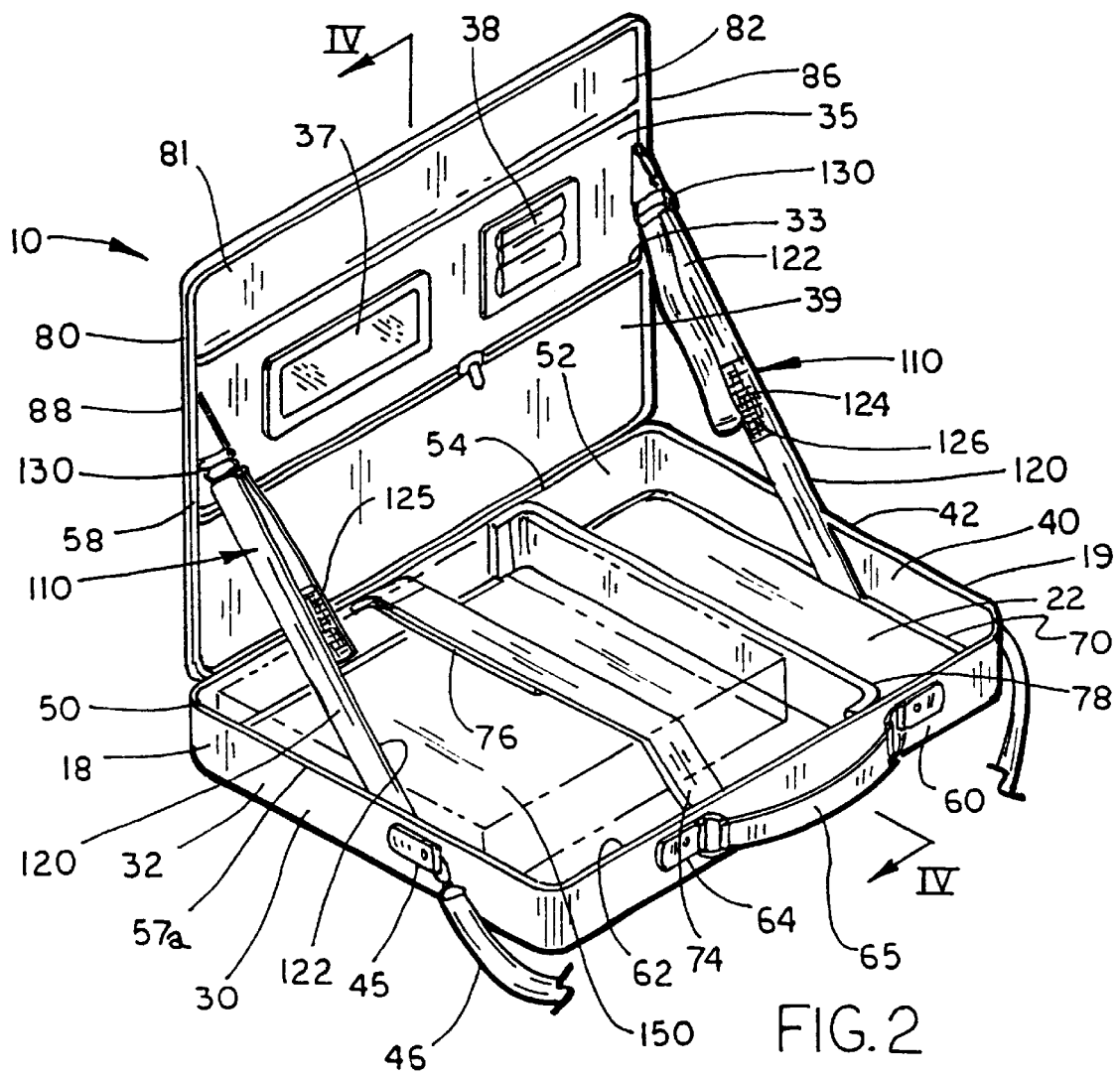
FIG. 2 is a perspective view of a computer case according to the invention shown in the open position, with a portable computer illustrated in phantom.

A pair of adjustment assemblies 110 are positioned between bottom wall 20 of compartment 18 and interior surface 82 of cover 80. Each adjustment assembly 110 includes a strap 120 affixed to bottom wall 20 and positioned proximate to a side 30 or 40 of compartment 18 and a loop 130 extending from interior surface 82 of cover 80 and proximate to side 86 or 88. Strap 120 is threaded through loop 130 and contains a first surface 122 upon which a fastener 124 is attached. As shown in FIG. 2, fastener 124 is a hook and loop fastener such as VELCRO™ with loop portion 125 and hook portion 126 being attached a preselected distance apart along surface 122 of strap 120. Adjustment assemblies 110 hold compartment 18 in a fixed position away from cover 80 when cover 80 is in open position and is supported on an object as set forth below, and permit an individual to vary the distance between cover member 80 and compartment 18. That is, adjustment assemblies 110 permit the user to affect the rotation of compartment 18 towards or away from cover 80 as the situation may require. Those with ordinary skill in the art will immediately recognize that other fasteners such as snaps, buckles or the like may be substituted for hook and loop fasteners 124, 126 without departing from the spirit and scope of the present invention.

Referring now to FIG. 5, there is shown a perspective view of computer case 10 mounted upon steering wheel 160. As illustrated, steering wheel 160 is positioned between sleeve 90 and cover 80. Sleeve 90 serves to hold steering wheel 160 against cover 80 and thereby provides rigid support for computer case 10. Once mounted, a user may adjust adjustment assemblies 110 to alter the position of compartment 18 relative to cover 80. Straps 74 and 76 are then removed from computer 150. Thereafter, computer 150 may be used in accordance with normal procedure, with compartment 18 functioning as a worksurface.

As shown in FIG. 5, steering wheel 160 is usually positioned between sleeve 90 and cover 80 but does not extend into pocket 100. It will be recognized that, depending upon its diameter, it is possible that a smaller diameter steering wheel 160 will extend between both sleeve 90 and cover 80, and pocket 100 and cover 80.

Figure 8:
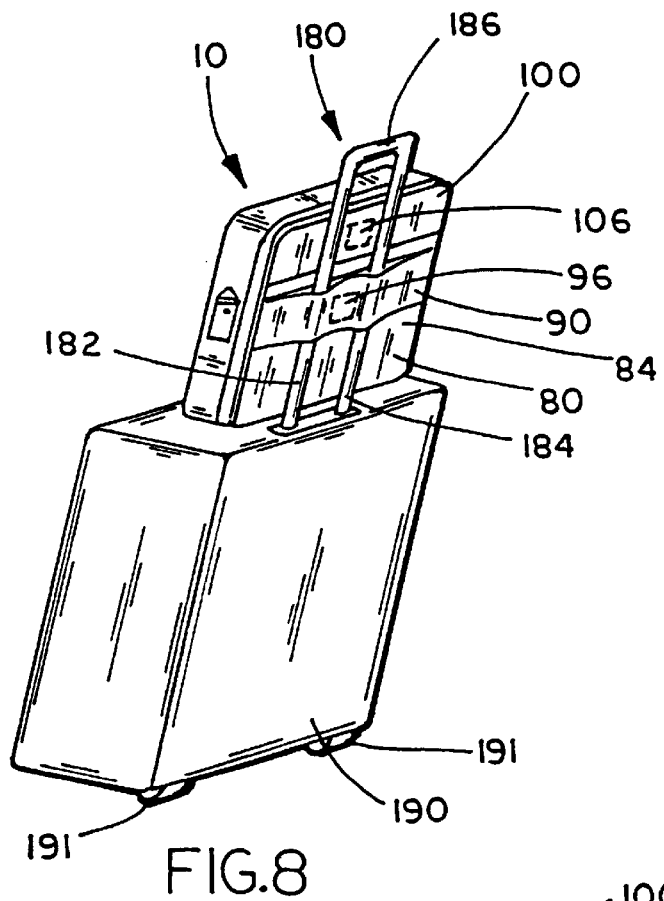
FIG. 8 is a rear, perspective view of a computer case according to the present invention shown in a closed position and illustrated in a preferred transport position when mounted to the rails of a piece of luggage.

Referring now to FIGS. 6 through 8, there is shown a computer case 10 attached to the transportation assembly 180 of luggage 190. Transportation assembly 180 is comprised of a pair of rails 182 and 184 positioned a preselected distance apart and joined at their distal ends by a handle 186. When not in use, transportation assembly 180 of luggage 190 can be telescopically retracted within luggage 180. As illustrated in both FIGS. 6 and 7, transportation assembly 180 is in the extracted or extended position.

Referring now specifically to FIG. 6, computer case 10 is mounted on transportation assembly 180 by placing rails 182 and 184 through sleeve 90 and into pocket 100. Thereafter, fasteners 96 and 106 are used to secure rails 184 and 186 firmly against cover 80. As such, the central portions 91, 101 of sleeve 90 and pocket 100 are removably attached between rails 184, 186 to securely hold cover 80, and thus case 10, in position on the rails. Case 10 may be mounted on rails 184, 186 such that compartment 18 projects beyond surface 190*a* of luggage 190, as illustrated in FIG. 6. Alternatively, case 10 can be mounted on rails 184, 186 so that compartment 18 extends beyond surface 1 90*b* of luggage 190 (FIG. 7).

When it is desired to transport computer case 10, it is first placed in the closed position with compartment 18 fastened to cover 80 by zipper assembly 56. Thereafter, rails 182 and 184 of transportation assembly 180 are placed between sleeve 90 and cover 80 as shown in FIG. 8. Fastener 96 is then used to fasten sleeve 90 to cover 80 between rails 182 and 184, thereby securing computer case 10 to transportation assembly 180. When secured in this manner, the outer portions of rails 182, 184 and handle 106 project above top surface 60 for ease in grasping so that luggage 190 may be easily rolled or pulled on rollers 191 behind the traveler.

Figure 9:
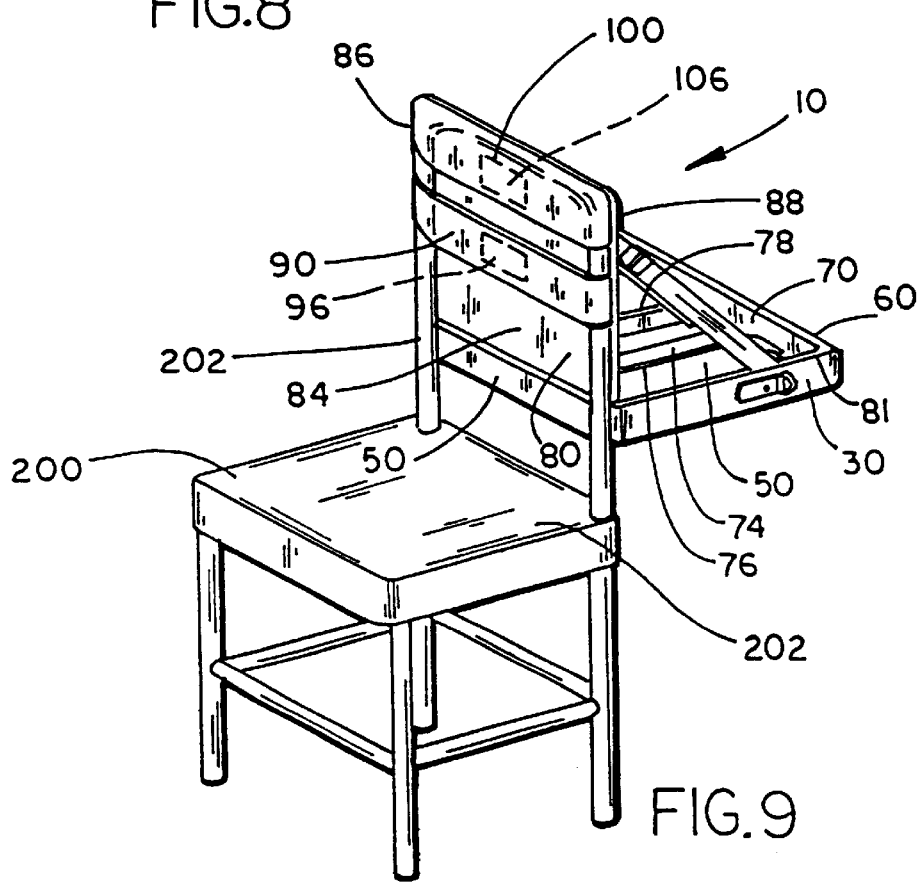
FIG. 9 is a rear, perspective view of a computer case according to the invention shown in the open position and mounted to the back of a chair.

Turning now to FIG. 9, computer case 10 is illustrated mounted to the back 202 of a chair 200. Computer case 10 is mounted on chair 200 by placing back 202 through sleeve 90 and into pocket 100. Fasteners 96 and 106 are then employed to further secure cover 80 to back 202. In this configuration, compartment 80 projects in a direction away from seat 205 of chair 200. It is preferred that back 202 of chair 200 extend in a substantially vertical direction so as to enable an individual to effectively and conveniently use a computer residing within an interior 70 of compartment 18.

The above description is considered that of the preferred embodiments only. Modifications of the invention will occur to those skilled in the art and to those who make or use the invention. For example, a rigid, planar surface may be substituted for compartment 18. With this substitution, the rigid surface provides a worksurface, and thus enables an individual to write on an appropriate paper tablet, perform calculations on a calculator, or work on a personal computer. Therefore, it is understood that the embodiments shown in the drawings and described above are merely for illustrative purposes and are not intended to limit the scope of the invention, which is defined by the following claims as interpreted according to the principles of patent law, including the doctrine of equivalents.

The embodiments of the invention in which an exclusive property or privilege is claimed are as follows:

1. A computer case comprising:

a compartment having a bottom, a front and an opposing rear, a first side and an opposing second side, said compartment defining an interior space dimensioned to receive a portable computer, said bottom having an interior surface and an exterior surface;

a rigid cover hingedly connected to said rear, said rigid cover having a top edge an interior surface and an exterior surface, said rigid cover being rotatable between a closed position in which said cover closes said compartment and an open position in which said rigid cover is rotated away from said compartment;

a cover fastener, said fastener removably fastening said rigid cover in said closed position;

an adjustment assembly attached to said bottom of said compartment and said rigid cover, said adjustment assembly adjusting the position of said compartment relative to the position of said rigid cover when said case is in said open position;

a mounting assembly carried by said exterior surface of said cover, said mounting assembly removably mounting said rigid cover to an object, said mounting assembly including a sleeve attached to said exterior surface of said rigid cover and a pocket attached to said exterior surface of said rigid cover, said pocket having a bottom, and wherein said sleeve is located below said bottom of said pocket.

2. The case as recited in claim 1, wherein said adjustment assembly includes a pair of straps extending between said rigid cover and said compartment, each of said straps having a variable length for adjustment of the position of said compartment with respect to said rigid cover in said open position.

3. The case as recited in claim 1, wherein said adjustment assembly further comprises:

a first strap attached to said interior surface of said bottom, said first strap positioned proximate to said first side;

a first loop extending from said interior surface of said rigid cover, said first loop dimensioned to receive said first strap;

a second strap attached to said interior surface of said bottom, said second strap positioned proximate to said second side;

a second loop extending from said interior surface of said rigid cover, said second loop dimensioned to receive said second strap;

a first strap fastener attached to said first strap; and a second strap fastener attached to said second strap.

4. The case as recited in claim 3, wherein said first strap has a first side, wherein said first strap fastener is a hook and loop fastener positioned on said first side, wherein the hook portion of said hook and loop fastener is positioned a preselected distance from the loop portion of said hook and loop fastener on said first side of said first strap, wherein said second strap has a first side, wherein said second strap fastener is a hook and loop fastener positioned on said first side, wherein the hook portion of said hook and loop fastener is positioned a preselected distance from the loop portion of said hook and loop fastener on said first side of said second strap.

5. The computer case as recited in claim 1, further comprising at least one mounting assembly fastener for removably fastening said mounting assembly to said exterior surface of said rigid cover.

6. The computer case as recited in claim 5, wherein said rigid cover has a first side and an opposing second side, and wherein said sleeve extends from said first side to said second side of said exterior surface of said rigid cover.

7. The computer case as recited in claim 6, wherein said sleeve is attached to said first side and said opposing second side of said rigid cover and wherein said sleeve is flexible to move away from said rigid cover to receive the object.

8. The computer case as recited in claim 5, wherein said sleeve has an interior surface and an exterior surface, and wherein said at least one mounting assembly fastener further comprises a first hook and loop fastener, wherein the hook portion of said first hook and loop fastener is attached to said interior surface of said sleeve and the loop portions of said first hook and loop fastener is attached to said exterior surface of said rigid cover.

9. The computer case as recited in claim 1, wherein said pocket is attached to said exterior surface of said top edge of said rigid cover .

10. The computer case as recited in claim 1, wherein said rigid cover has a first side, a second side, and a bottom side, and said pocket is attached to said first and said second sides of said exterior surface of said rigid cover, said pocket opening toward said bottom edge of said rigid cover.

11. The computer case as recited in claim 9, wherein said pocket is flexible to move away from said rigid cover to receive the object.

12. The computer case as recited in claim 8, wherein said pocket has an interior surface and wherein said at least one mounting assembly fastener further comprises a second hook and loop fastener, wherein the hook portion of said second hook and loop fastener is attached to said interior surface of said pocket and the loop portion of said second hook and loop fastener is attached to said exterior surface of said rigid cover.

13. The computer case as recited in claim 1, wherein said rigid cover further comprises a rigid support positioned between said interior surface and said exterior surface of said cover.

14. The computer case as recited in claim 2, further comprising a rigid support positioned between said interior surface and said exterior surface of said bottom.

* * * * *